US009685783B2

(12) United States Patent
Raneri et al.

(10) Patent No.: US 9,685,783 B2
(45) Date of Patent: Jun. 20, 2017

(54) CONTROLLABLE ELECTRICAL OUTLET WITH A CONTROLLED WIRED OUTPUT

(71) Applicant: Lutron Electronics Co., Inc., Coopersburg, PA (US)

(72) Inventors: Daniel Curtis Raneri, Orefield, PA (US); Joseph C. Guellnitz, Albrightsville, PA (US); Joel S. Spira, Coopersburg, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 358 days.

(21) Appl. No.: 14/634,257

(22) Filed: Feb. 27, 2015

(65) Prior Publication Data

US 2015/0249337 A1 Sep. 3, 2015

Related U.S. Application Data

(60) Provisional application No. 61/946,127, filed on Feb. 28, 2014.

(51) Int. Cl.
*H02J 1/10* (2006.01)
*H02J 3/00* (2006.01)
*H01R 13/66* (2006.01)
*H01R 25/00* (2006.01)
*H01R 31/06* (2006.01)
*H01R 24/78* (2011.01)

(52) U.S. Cl.
CPC .......... *H02J 3/005* (2013.01); *H01R 13/6683* (2013.01); *H01R 25/006* (2013.01); *H01R 31/065* (2013.01); *H01R 24/78* (2013.01); *Y10T 307/352* (2015.04)

(58) Field of Classification Search
CPC ....... G05F 1/585; G05F 1/577; B23K 9/1068; H02J 1/14; H02M 3/1584
USPC .......................................... 307/24, 31, 32, 42
See application file for complete search history.

(56) References Cited

U.S. PATENT DOCUMENTS 5,363,269 A 11/1994 McDonald
5,754,445 A * 5/1998 Jouper .................. H02J 1/14
700/276

(Continued)

FOREIGN PATENT DOCUMENTS

WO WO 01/33527 A1 5/2001

*Primary Examiner* — Quan Tra
(74) *Attorney, Agent, or Firm* — Condo Roccia Koptiw LLP

(57) ABSTRACT

A load control system having a controllable electrical outlet provides a low cost solution for controlling a plurality of standard electrical outlets. The controllable electrical outlet may be coupled in series between a power source and at least one standard electrical outlet for controlling the power delivered to the standard electrical outlet. The controllable electrical outlet may comprise an actuator for allowing the controllable electrical outlet to be associated with an input device for receiving digital messages from the input device. The controllable electrical outlet may be installed in a standard electrical wallbox, e.g., replacing a previously-installed standard electrical outlet. The actuator may be easily accessed to associate the controllable electrical outlet with the input device and a radio-frequency receiver and antenna may be located in the controllable electrical outlet to provide optimum reception of radio-frequency signals.

41 Claims, 3 Drawing Sheets

(56) References Cited

U.S. PATENT DOCUMENTS

| | | | |
|---|---|---|---|
| 6,252,407 B1 | 6/2001 | Gershen | |
| 7,756,556 B2 | 7/2010 | Patel et al. | |
| 7,938,676 B1 | 5/2011 | Patel et al. | |
| 8,105,094 B2 | 1/2012 | Patel et al. | |
| 8,175,533 B2 * | 5/2012 | Schubert | H01R 13/66 455/66.1 |
| 8,417,388 B2 | 4/2013 | Altonen et al. | |
| 8,823,268 B2 | 9/2014 | Saveri, III et al. | |
| 8,918,346 B2 * | 12/2014 | Lu | G06F 1/00 706/12 |
| 9,167,669 B2 | 10/2015 | Karc et al. | |
| 9,172,245 B1 * | 10/2015 | Lentine | H02J 3/00 |
| 9,201,481 B2 * | 12/2015 | Hirosaka | G06F 1/266 |
| 2010/0070217 A1 | 3/2010 | Shimada et al. | |
| 2011/0304205 A1 * | 12/2011 | Lee | G01R 21/133 307/31 |
| 2012/0194952 A1 * | 8/2012 | Crucs | H02H 3/12 361/52 |
| 2012/0296486 A1 | 11/2012 | Marriam et al. | |
| 2013/0234534 A1 | 9/2013 | Lin | |
| 2014/0132084 A1 | 5/2014 | Pham et al. | |

\* cited by examiner

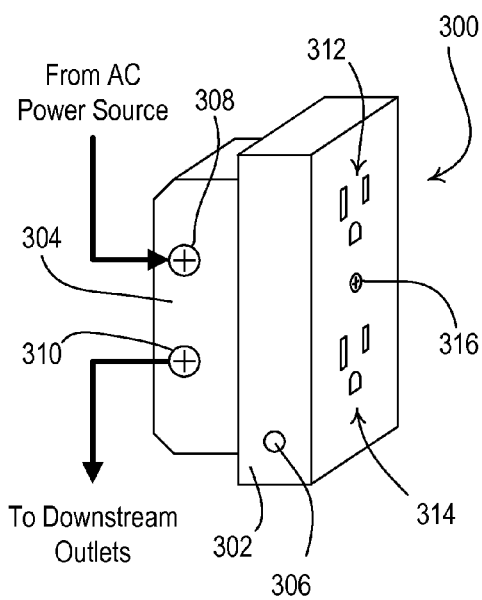
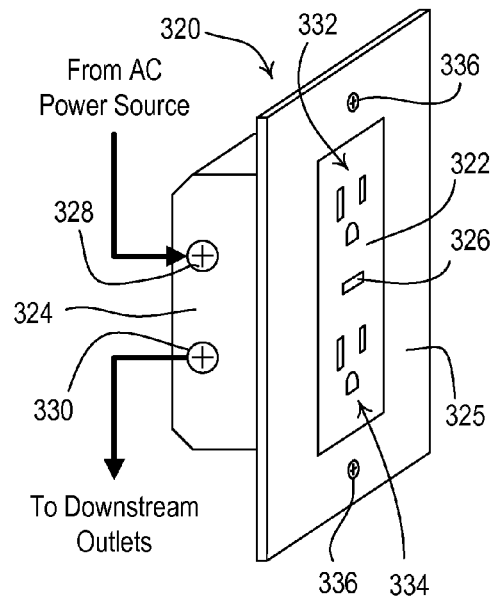
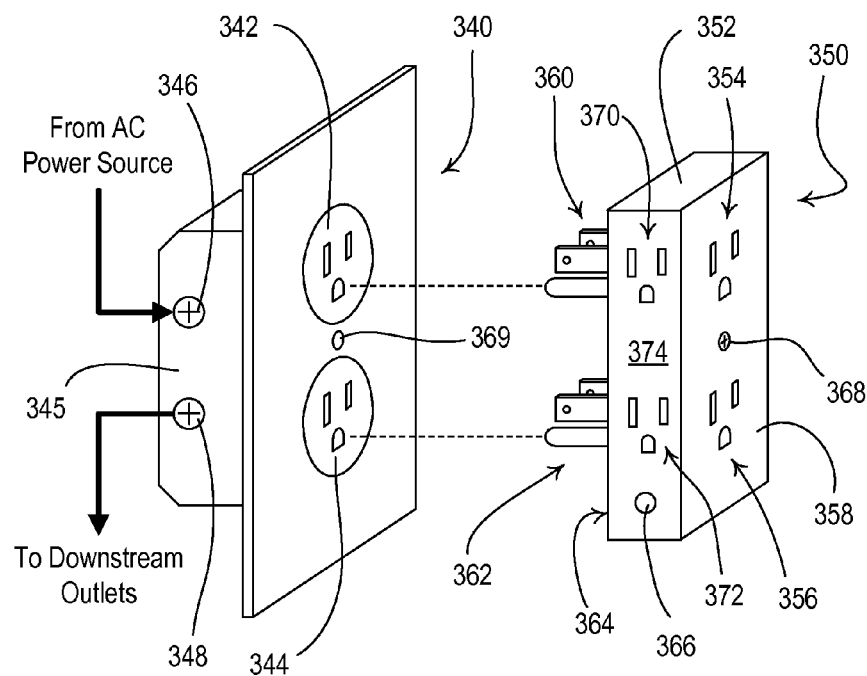

CONTROLLABLE ELECTRICAL OUTLET WITH A CONTROLLED WIRED OUTPUT

CROSS-REFERENCE TO RELATED APPLICATIONS

This application claims priority to commonly-assigned U.S. Provisional Application No. 61/946,127, filed Feb. 28, 2014, entitled CONTROLLABLE ELECTRICAL OUTLET WITH A CONTROLLED WIRED OUTPUT, the entire disclosure of which is hereby incorporated by reference.

BACKGROUND

Field of the Disclosure

The present disclosure relates to a load control system for controlling the power delivered to one or more electrical loads, and more particularly, to a load control system comprising a controllable electrical outlet having a controlled wired output for controlling the power delivered to outlets of other electrical outlets and thus electrical loads connected to those outlets.

Description of the Related Art

Many consumers reduce the total cost of electrical energy by reducing the total energy usages of electrical loads, such as lighting loads. For example, lighting loads are often controlled in response to occupancy and vacancy sensors, which detect occupancy and/or vacancy conditions in a space, to save energy. Typically, the lighting loads are turned on when the space is occupied and turned off when the space is unoccupied. In addition, consumers are becoming more sensitive to the amount of energy consumed by electrical loads, such as plug-in electrical loads that are plugged into electrical receptacles. Such plug-in electrical loads may still consume energy to maintain a standby mode when "turned off" and are often referred to as "vampire" loads. Some standards (such as ASHRAE 90.1 and California Title 24) are now requiring that many electrical outlets installed in new construction or major renovations must be controlled (e.g., switched) to provide energy savings. For example, the electrical outlets may be controlled in response to a time-clock and/or an occupancy or vacancy sensor.

Some prior art systems for controlling (e.g., switching) electrical outlets include load control devices that may be remotely-located, for example, out of view above a ceiling of a room, behind a wall of a room, or in a remote electrical closet. Installation of these prior art systems may be complicated since electrical wires need to be run from the remotely-located load control devices to the electrical outlets. The load control devices may be responsive to input devices (e.g., wireless transmitters), such as timeclocks and/or an occupancy or vacancy sensors. However, to program the load control device to be responsive to the input devices, the remotely-located load control devices must be accessed (e.g., to press a button on the load control device), which increases the time (and thus the cost) required to program the system since the load control device is remotely located from the input devices. Further, the need to have an additional load control device for controlling the electrical outlets adds cost to the load control system.

Some prior art electrical outlets are configured to directly receive wireless signals, e.g., radio-frequency (RF) signals, such that an additional remotely-located load control device is not required to control the electrical outlets. However, these RF-responsive electrical outlets cost more than a standard electrical outlet. In order to provide control of most of the electrical outlets in a building, an RF-responsive electrical outlet must be installed in each and every wallbox where control of plug-in electrical loads is desired, which greatly adds to the cost of the load control system.

SUMMARY

As described herein, a load control system having a controllable electrical outlet may provide a low cost solution for controlling a plurality of standard electrical outlets. The load control system may not require any additional electrical devices (e.g., other than the controllable electrical outlet) to control the standard electrical outlets, which for example, may make it simple to install. The controllable electrical outlet may be coupled in series between a power source and at least one standard electrical outlet for controlling the power delivered to the standard electrical outlet. The controllable electrical outlet may comprise one or more of: (1) at least one electrical receptacle adapted to receive a plug of a plug-in electrical load; (2) a first electrical connection adapted to be electrically coupled to the power source for receiving a hot voltage for powering the electrical load; (3) a second electrical connection adapted to be electrically coupled to the standard electrical outlet; (4) a load control circuit coupled in series electrical connection between the first and second electrical connections for controlling the power delivered to the standard electrical outlet; (5) a communication circuit for receiving a digital message; or (6) a digital control circuit coupled to the load control circuit and the communication circuit for controlling the power delivered to the standard electrical outlet in response to the digital message received via the communication circuit.

The controllable electrical outlet may also comprise one or more actuators. An actuator may provide a user interface for configuring the controllable electrical outlet. For example, an actuator may be used to associate the controllable electrical outlet with an input device (e.g., a radio-frequency (RF) transmitter), such that the communication circuit is able to receive the digital message from the input device. The controllable electrical outlet may be installed in a standard electrical wallbox, e.g., replacing a previously-installed standard electrical outlet. The actuator may be located on an exterior face of the controllable electrical outlet, for example, such that it may be easily accessed to associate the controllable electrical outlet with the input device thus simplifying configuration of the load control system. The communication circuit (e.g., an RF receiver and antenna) may be located in the controllable electrical outlet (e.g., in the same room as an input device), for example, to provide optimum reception of wireless signals from an input device. The controllable electrical outlet may be controlled manually (e.g., in response to remote controls) and/or automatically (e.g., in response to sensors and/or timeclocks). The controllable electrical outlet may also be configured to measure the power consumed by electrical loads plugged into the second electrical connection and report the power usage information via the RF signals.

In addition, a load control system for controlling one or more plug-in electrical loads adapted to receive power from a power source is described herein. The load control system may comprise a standard electrical outlet adapted to receive power from the power source, a controllable electrical outlet adapted to receive power from the power source, and an input device configured to transmit a digital message to the controllable electrical outlet. The controllable electrical outlet may comprise at least one electrical receptacle configured to receive a plug of a plug-in electrical load and an electrical connection configured to be electrically coupled to the standard electrical outlet. The controllable electrical outlet may be configured to control the power delivered to the standard electrical outlet in response to the digital message received via the communication circuit.

BRIEF DESCRIPTION OF THE DRAWINGS

FIGS. 3A-3C are perspective views of example controllable electrical outlets.

DETAILED DESCRIPTION

Figure 1:
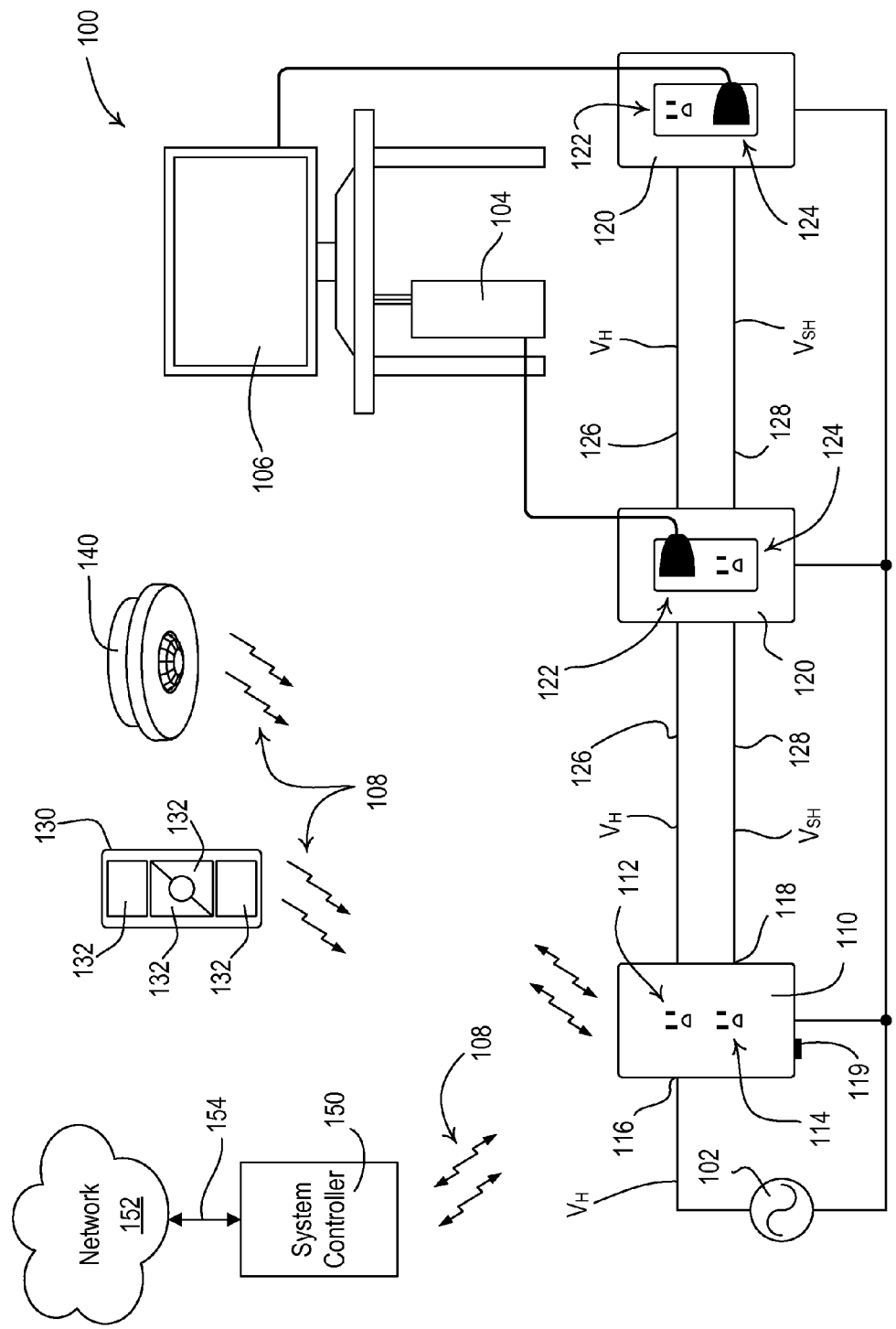
FIG. 1 is a simple diagram of an example load control system having a controllable electrical outlet.

FIG. 1 is a simple diagram of an example load control system 100 having a load control device (e.g., a controllable electrical outlet 110), a plurality of standard electrical outlets 120, and a plurality of plug-in electrical loads (e.g., a computer 104 and a monitor 106). The controllable electrical outlet 110 may be adapted to be installed in a standard electrical wallbox (not shown). The controllable electrical outlet 110 may be adapted to be connected to a power source, such as an alternating-current (AC) power source 102 for receiving a hot voltage $V_H$ (e.g., an AC mains line voltage, such as 120 V at 60 Hz or 230 V at 50 Hz) at a line voltage input 116 (e.g., a hot terminal). The controllable electrical outlet 110 may also be connected to the neutral side of the AC power source 102. Alternatively or additionally, the controllable electrical outlet 110 may be configured to receive power from a direct-current (DC) power source.

The controllable electrical outlet 110 may comprise upper and lower receptacles 112, 114 into which the plug of a plug-in electrical load may be plugged. Each receptacle 112, 114 may have a hot connection and a neutral connection for receipt of the corresponding prongs of an electrical plug. The controllable electrical outlet 110 may provide the hot voltage $V_H$ at the upper receptacle 112, such that any electrical loads plugged into the upper receptacle are continuously powered. The controllable electrical outlet 110 may comprise an internal load control circuit (not shown), e.g., a relay for generating a switched-hot voltage $V_{SH}$, which may be provided at the lower receptacle 114. Accordingly, any electrical loads plugged into the lower receptacle 114 may be powered and unpowered in response to closing and opening the relay, respectively. Alternatively, the upper and lower receptacles 112, 114 could both provide the hot voltage $V_H$ or both could provide the switched-hot voltage $V_{SH}$, or the controllable electrical outlet 110 may provide the hot voltage $V_H$ at the lower receptacle 114 and the switched-hot voltage $V_{SH}$ at the upper receptacle 112.

The controllable electrical outlet 110 may also comprise a controlled wired output 118 (e.g., a switched-hot terminal) for providing the switched voltage $V_{SH}$ to the standard electrical outlets 120. The standard electrical outlets 120 may each be configured to receive both the hot voltage $V_H$ and the switched-hot voltage $V_{SH}$. For example, the standard electrical outlets 120 may receive the hot voltage $V_H$ via an electrical wire 126 connected to the line voltage input 116 of the controllable electrical outlet 110. The standard electrical outlets 120 may receive the switched-hot voltage $V_{SH}$ via an electrical wire 128 connected to the controlled wired output 118 of the controllable electrical outlet 110. One or more of the standard electrical outlets 120 may also be connected to the neutral side of the AC power source 102. The controllable electrical outlet 110 may "pass through" the hot voltage $V_H$ to provide the hot voltage $V_H$ from the AC power source 102 to the electrical wire 126 (e.g., directly). Alternatively, the electrical wire 126 may be wired to the hot side of the AC power source 102 around the controllable electrical outlet 110, such that the hot voltage $V_H$ does not pass through the controllable electrical outlet 110 on its way to the standard electrical outlet 120.

Each of the standard electrical outlets 120 may comprise upper and lower receptacles 122, 124 into which an electrical load may be plugged. The upper receptacle 122 of a standard electrical outlet 120 may be electrically coupled to the electrical wire 126 for receiving the hot voltage $V_H$, such that any electrical loads plugged into the upper receptacles are continuously powered. The lower receptacle 124 of a standard electrical outlet 120 may be electrically coupled to the electrical wire 128 for receiving the switched-hot voltage $V_{SH}$, such that any electrical loads plugged into the lower receptacle may be powered and unpowered in response to the closing and opening, respectively, of the relay of the controllable electrical outlet 110. Referring to the example of FIG. 1, the computer 104 may be adapted to be plugged into the upper receptacle 122 of one of the standard electrical outlets 120 (e.g., such that the computer 104 is continuously powered), while the monitor 106 may be adapted to be plugged into the lower receptacle 124 of one of the standard electrical outlets (e.g., such that the monitor 106 may be turned on and off by the controllable electrical outlet 110. Alternatively, the upper and lower receptacles 122, 124 of a standard electrical outlet 120 could both be coupled to the hot voltage $V_H$ or could both be coupled to the switched-hot voltage $V_{SH}$.

The controllable electrical outlet 110 may be configured to measure the magnitude of the total load current conducted by one or more of the plug-in electrical loads plugged into the controllable electrical outlet 110 and/or the standard electrical outlets 120. For example, the controllable electrical outlet 110 may be configured to measure the magnitude of a first load current conducted by the switched electrical loads (e.g., the electrical loads connected to the lower receptacle 124), and the magnitude of a second load current conducted by the unswitched electrical loads (e.g., the electrical loads connected to the upper receptacle 122).

The controllable electrical outlet 110 may be configured to control the relay to turn the electrical loads plugged into the lower receptacles 114, 124 and/or the standard electrical outlets 120 on and off in response to wireless signals, e.g., radio-frequency (RF) signals 108, received from one or more input devices (e.g., RF transmitters). For example, the input devices may comprise a remote control device 130, an occupancy sensor 140, and/or a system controller 150 (e.g., a central controller or gateway device). As such, the controllable electrical outlet 110 may be controlled automatically (e.g., via an occupancy sensor 140) or manually (e.g., via a remote control device 130). Because the controllable electrical outlet 110 may comprise the controlled wired output 118 for controlling the standard electrical outlets 120, the standard electrical outlets 120 do not need to be responsive to the RF signals 106 in order to switch the respective plug-in electrical loads on and off, thus greatly reducing the cost of the load control system 100.

The remote control device 130 may comprise a battery-powered handheld remote control, or could alternatively be mounted to a wall or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, the entire disclosures of which are hereby incorporated by reference.

The remote control device 130 may transmit digital messages to the controllable electrical outlet 110 via the RF signals 108 in response to actuations of one or more buttons 132 for turning the electrical loads plugged into the lower receptacles 114, 124 on and off. The remote control device 130 may be associated with the controllable electrical outlet 110 by actuating one or more of the buttons 132 of the remote control device and an actuator (e.g., programming button 119) of the controllable electrical outlet 110. Since the controllable electrical outlet 110 may be adapted to be installed in a standard electrical wallbox and the programming button 119 may be located on the controllable electrical outlet 110, the programming button 119 may be easily accessed to associate the controllable electrical outlet 110 with the remote control device 130. In addition, the controllable electrical outlet 110 may be installed in the same room in which the remote control device 130 is located to enhance the reliability of the RF communications. Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM; U.S. Patent Application Publication No. 2013/0214609, published Aug. 22, 2013, entitled TWO-PART LOAD CONTROL SYSTEM MOUNTABLE TO A SINGLE ELECTRICAL WALLBOX; and U.S. patent application Ser. No. 13/830,237, filed Mar. 14, 2013, entitled COMMISSIONING LOAD CONTROL SYSTEMS; the entire disclosures of which are hereby incorporated by reference.

The occupancy sensor 140 may be configured to detect occupancy and vacancy conditions in the space in which the load control system 100 is installed. The occupancy sensor 140 may transmit digital messages to the controllable electrical outlet 110 via the RF signals 108 in response to detecting the occupancy or vacancy conditions. The controllable electrical outlet 110 may be configured to turn the electrical loads plugged into the lower receptacles 114, 124 on in response to an occupancy condition and off in response to a vacancy condition. The occupancy sensor 140 may be associated with the controllable electrical outlet 110 by actuating a button on the occupancy sensor and/or an actuator (e.g., the programming button 119) of the controllable electrical outlet 110. Since the controllable electrical outlet 110 may be located in the same room as the occupancy sensor 140, the occupancy sensor 140 may be easily associated with the controllable electrical outlet 110 and reliable RF communications may be provided. Alternatively, the occupancy sensor 140 may operate as a vacancy sensor to only turn off the lighting loads in response to detecting a vacancy condition (e.g., to not turn on the lighting loads in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The system controller 150 may be configured to communicate with a network 152 (e.g., a wireless or wired local area network) via a wired digital communication link 154 (e.g., an Ethernet communication link) for access to the Internet. Alternatively or additionally, the system controller 150 may be wirelessly connected to the network 152, e.g., using Long-Term Evolution (LTE) or Wi-Fi technology. For example, the system controller 150 may be configured to receive digital messages (e.g., Internet Protocol packets) via the network 152 from a network device (not shown), such as a smart phone (e.g., an iPhone® smart phone, an Android® smart phone, or a Blackberry® smart phone), a personal computer, a laptop, a wireless-capable media device (e.g., MP3 player, gaming device, or television), a tablet device, (e.g., an iPad® hand-held computing device), a Wi-Fi or wireless-communication-capable television, or any other suitable Internet-Protocol-enabled device. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 150 may operate as a central controller for the load control system 100. The system controller 150 may operate as a gateway device to simply relay digital messages between the network 152 and the controllable electrical outlet 110. The system controller 150 may be configured to transmit digital messages via the RF signals 108 to the controllable electrical outlet 110 for turning on and off the electrical loads plugged into the controllable electrical outlet 110 and/or the standard electrical outlets 120. Accordingly, the controllable electrical outlet 110 may be responsive to data received by the system controller 150 from the Internet, such as weather information and emergency status information. The system controller 150 may be further configured to transmit digital messages including one or more of: a timeclock command, a load shed command, a demand response command, a peak demand command, or time-of-day pricing information. The system controller 150 may be configured to control the controllable electrical outlet 110 in accordance with one or more timeclock events of a timeclock schedule, for example, to turn on the switched electrical loads during the day and to turn off the switched electrical loads at night. In addition, the controllable electrical outlet 110 may be configured to transmit feedback information, such as the status and energy consumption of the controlled loads (e.g., load current), back to the system controller 150, which may be configured to report the information to an external device via the network 152.

The controllable electrical outlet 110 may be configured to store information regarding the type of input device from which the controllable electrical outlet 100 received the digital message. The controllable electrical outlet 110 may be configured to store information regarding how the controllable electrical outlet 110 controlled the electrical loads in response to receiving the digital message. For example, this may be performed by the controller electrical outlet 110 after controlling the electrical loads plugged into the controllable electrical outlet 110 and/or the standard electrical outlets 120 in response to a digital messages received via the RF signals 108. The controllable electrical outlet 110 may transmit this information to the system controller 150. The system controller 150 may analyze this information to determine how much energy is saved in response to certain types of input devices. For example, the system controller 150 may be configured to determine how much energy is saved as a result of the controllable electrical outlet 110 turning off the electrical loads plugged into the controllable electrical outlet 110 and/or the standard electrical outlets 120 in response to the occupancy sensor 140 versus how much energy is saved as a result of the controllable electrical outlet turning off the electrical loads in response to the remote control device 130.

The controllable electrical outlet 110 may be configured to determine a balance between the amount of power consumed by the switched and unswitched electrical loads and report this information to the system controller 150. The system controller 150 may be configured to transmit (e.g., to a network device via the network 152) a digital message including an alert that the amount of power consumed by the switched and unswitched electrical loads is unbalanced, for example, if the unswitched electrical loads are consuming a much greater amount of power than the switched electrical loads. For example, the alert may be included in an email or text message sent to a building manager.

Some plug-in electrical loads may still consume energy to maintain a standby mode when off. These electrical loads may be referred to as "vampire" loads. In addition, some plug-in power supplies may still consume energy even when the power supply is not charging a rechargeable load. The controllable electrical outlet 110 may be configured to detect whether one or more of the plug-in electrical loads plugged into the controllable electrical outlet 110 and/or the standard electrical outlets 120 are off, are in the standby mode, and/or are not charging a rechargeable load. The controllable electrical outlet 110 may be configured to determine that a plug-in electrical load is off, is in standby mode, and/or is not charging a rechargeable load if the magnitude of the load current conducted by the plug-in electrical load is less than a predetermined current threshold. For example, the controllable electrical outlet 110 may be configured to remove power from the plug-in electrical load if the controllable electrical outlet has received a digital message indicating a vacancy condition from the occupancy sensor 140 and has determined that the plug-in electrical load is off, is in the standby mode, and/or is not charging a rechargeable load. The controllable electrical outlet 110 will not remove power from the plug-in electrical load when the load is on or charging. For example, if a television is on, the television is considered to be in use independent of whether the room is occupied or not. Perhaps the user is listening to a particular program on the television from another room. When the television is turned off (e.g., changed to standby mode), the controllable electrical outlet 110 may disconnect the television from the AC power source when the room becomes unoccupied, for example, to save energy.

The plug-in electrical load may be configured to communicate (e.g., wirelessly communicate), to the system controller 150, information relating to whether the plug-in electrical load is off, in the standby mode, and/or not charging a rechargeable load. For example, the plug-in electrical load may be configured to send a digital message to the system controller 150 when the plug-in electrical load is in the standby mode. Accordingly, the system controller 150 may be configured to determine that the plug-in electrical load is in a standby mode and control the controllable electrical outlet 110 (e.g., the load control circuit of the controllable electrical outlet 110) to disconnect power from the plug-in electrical load. For example, the system controller 150 may send a digital message to the controllable electrical outlet 110 indicating that the controllable electrical outlet 110 should disconnect power from the plug-in electrical load.

The plug-in electrical load may be configured to communicate (e.g., wirelessly communicate), to the system controller 150, information relating to an electrical signature of the plug-in electrical load. The system controller 150 may be configured to compare the electrical signature of the plug-in electrical load to one or more electrical signatures stored in a memory. The system controller 150 may be configured to send a digital message to the controllable electrical outlet 110 to cease controlling the power delivered to the plug-in electrical load in response to the digital message, for example, if the electrical signature of the plug-in electrical load matches one of the electrical signatures stored in the memory.

Some plug-in electrical loads may be critical loads that should be continuously powered (e.g., computers, medical devices, etc.). The controllable electrical outlet 110 may be configured to determine if a critical load is plugged into the controllable electrical outlet 110 and/or the standard electrical outlets 120 and to prevent the critical load from being turned off, e.g., by disabling control of the critical load by the input devices (e.g., the remote control device 130, the occupancy sensor 140, and/or the controller 150). For example, the controllable electrical outlet 110 may be configured to determine that the computer 104 is plugged into one of the controllable electrical outlet 110 and/or the standard electrical outlets 120 by monitoring an electrical signature of the load current drawn by the computer. The controllable electrical outlet 110 may be configured to record and store the electrical signature of the load current conducted by the computer 104 when the computer 104 is plugged into the controllable electrical outlet 110 and/or the standard electrical outlets 120, e.g., when the load control system 100 is first configured after installation. The controllable electrical outlet 110 may also have one or more predetermined electrical signatures of critical loads stored in memory prior to installation. During normal operation, the controllable electrical outlet 110 may be configured to compare an electrical signature drawn by an electrical load to one or more of the plurality of electrical signatures stored in memory. If the controllable electrical outlet 110 determines that an electrical load plugged into the controllable electrical outlet 110 and/or a standard electrical outlet 120 is a critical load via its electrical signature (e.g., that the electrical load is the computer 104), the controllable electrical outlet 110 may be configured to continuously power the electrical load at all times, e.g., by not disconnecting power from the electrical load in response to the remote control device 130, the occupancy sensor 140, and/or the controller 150.

The controllable electrical outlet 110 may be configured to determine that the room in which an electrical load (e.g., the computer 104 and/or the monitor 106) is located is occupied in response to the magnitudes of the load currents conducted by the switched and/or unswitched electrical loads. For example, if the magnitude of the load current conducted by the computer 104 has increased and/or is actively changing, the controllable electrical outlet 110 may be configured to determine that the room in occupied. If the controllable electrical outlet 110 determines that one or more of the electrical loads plugged into the controllable electrical outlet 110 and/or the standard electrical outlets 120 are off, are in the standby mode, and/or are not charging a rechargeable load, the controllable electrical outlet 110 may determine that the room is vacant. The controllable electrical outlet 110 may be configured to turn on and off the electrical loads plugged into the controllable electrical outlet 110 and/or the standard electrical outlets 120 in response to the occupancy and/or vacancy conditions determined from the magnitudes of the load currents. Alternatively or additionally, the system controller 150 may be configured to determine information regarding an occupancy or vacancy condition in a space in which the controllable electrical outlet 110 is installed in response to the magnitude of the load current measured by the controllable electrical outlet 110. For example, the controllable electrical outlet 110 may transmit, to the system controller 150, a digital message that includes information relating to the magnitudes of the load currents conducted by the switched and/or unswitched electrical loads.

As described above, the remote control device 130, the occupancy sensor 140, and/or the system controller 150 may operate as a control-source device (e.g., an RF transmitter) and the controllable electrical outlet 110 may operate as a control-target device (e.g., an RF receiver). Alternatively or additionally, the control devices of the load control system 100 may comprise an RF transceiver, such that the devices are able to transmit and receive the RF signals 108. For example, the controllable electrical outlet 110 may be configured to transmit feedback information, such as the status and energy consumption of the controlled loads, back to the system controller 150, which may be configured to report the information to external devices via the network 152. Examples of RF load control systems are described in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, and U.S. Patent Application Publication No. 2014/0001977, published Jan. 2, 2014, entitled LOAD CONTROL SYSTEM HAVING INDEPENDENTLY-CONTROLLED UNITS RESPONSIVE TO A BROADCAST CONTROLLER, the entire disclosures of which are both hereby incorporated by reference.

In addition, the controllable electrical outlet 110 may operate a signal repeater of the load control system 100. For example, the controllable electrical outlet 110 may be configured to receive a digital message from one of the control devices of the load control system 100 (e.g., the remote control device 130, the occupancy sensor 140, the system controller 150, or another controllable electrical outlet) and to retransmit the digital message to other control devices of the load control system (e.g., the system controller 150 or another controllable electrical outlet). Examples of RF load control systems having signal repeaters are described in greater detail in commonly-assigned U.S. Pat. No. 5,848,054, issued Dec. 8, 1998, entitled REPEATER FOR TRANSMISSION SYSTEM FOR CONTROLLING AND DETERMINING THE STATUS OF ELECTRICAL DEVICES FROM REMOTE LOCATIONS, and U.S. Pat. No. 6,803,728, issued Oct. 12, 2004, entitled SYSTEM FOR CONTROL OF DEVICES, the entire disclosures of which are hereby incorporated by reference.

Since the controllable electrical outlet 110 may be adapted to be installed in the standard electrical wallbox and may be responsive to the RF signals 108 (e.g., that are transmitted directly to the controllable electrical outlet 110), the load control system 100 may not require any additional control devices (e.g., load control devices installed above the ceiling of the room, behind the walls of the room, or in an electrical closet) in order to provide control of the electrical loads plugged into the controllable electrical outlet 110 and the standard electrical outlets 120 in response to the RF signals 108. This reduces the overall cost of the load control system 100 and simplifies the installation of the load control system 100 since no additional control devices need to be installed.

The controllable electrical outlet 110 could be responsive to other types of input devices, such as, for example, daylight sensors, radiometers, cloudy-day sensors, shadow sensors, window sensors, temperature sensors, humidity sensors, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices (such as fire protection, water protection, and medical emergency devices), power monitoring devices (such as power meters, energy meters, utility submeters, utility rate meters), residential, commercial, or industrial controllers, interface devices with other control systems (such as security systems and emergency alert systems), and/or any combination of these input devices. One or more of the different types of input devices may be provided in a single load control system 100.

The load control system 100 may also comprise one or more other types of plug-in electrical load and/or switched electrical loads, such as, for example, lighting loads (e.g., incandescent lamps, halogen lamps, electronic low-voltage lighting loads, and magnetic low-voltage lighting loads); dimming ballasts for driving gas-discharge lamps; light-emitting diode (LED) drivers for driving LED light sources; table or floor lamps; screw-in luminaires including dimmer circuits and incandescent or halogen lamps; screw-in luminaires including ballasts and compact fluorescent lamps; screw-in luminaires including LED drivers and LED light sources; motor loads, such as ceiling fans and exhaust fans; motorized window treatments; projection screens; motorized interior or exterior shutters; heating and/or cooling systems; heating, ventilation, and air-conditioning (HVAC) systems; air conditioners; compressors; electric baseboard heater controllers; controllable dampers; variable air volume controllers; fresh air intake controllers; ventilation controllers; hydraulic valves for use in radiators and radiant heating system; humidity control units; humidifiers; dehumidifiers; water heaters; boiler controllers; pool pumps; refrigerators; freezers; appliances; televisions; computer monitors; printers; copiers; fax machines; video cameras; audio systems; amplifiers; speakers; overhead projectors; visual presenters; smart boards; coffee makers; toasters; elevators; power supplies; generators; electric chargers; electric vehicle chargers; medical devices (e.g., heart/lung machines), or alternative energy controllers.

Figure 2:
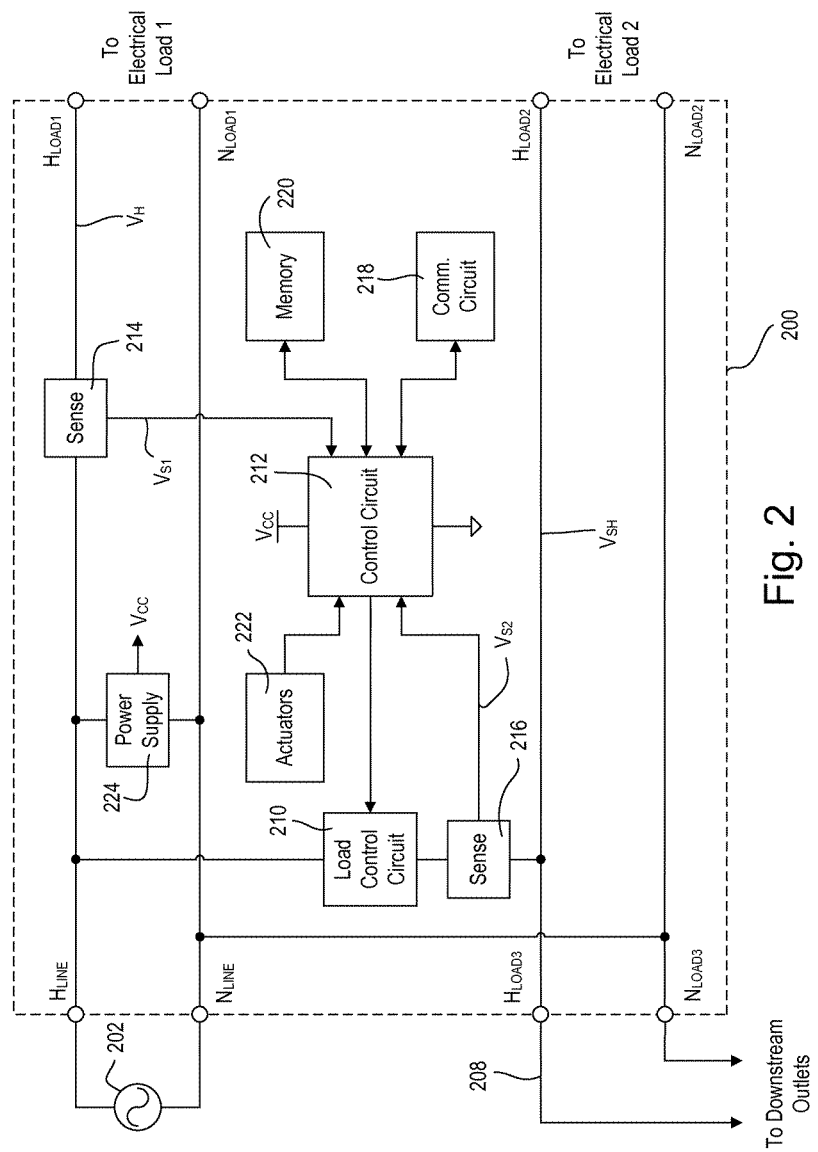
FIG. 2 is a simplified block diagram of an example controllable electrical outlet.

FIG. 2 is a simplified block diagram of an example controllable electrical outlet 200 that may be deployed as, for example, the controllable electrical outlet 110 of the load control system 100 shown in FIG. 1. The controllable electrical outlet 200 may be adapted to be mounted in a standard electrical wallbox. As shown, the controllable electrical outlet 200 may include a line-side hot electrical connection $H_{LINE}$ (e.g., the line voltage input 116) and a line-side neutral electrical connection $N_{LINE}$. The line-side hot electrical connection $H_{LINE}$ and the line-side neutral electrical connection $N_{LINE}$ may be coupled to an AC power source 202 (e.g., the AC power source 102) for receiving a power source voltage (e.g., the hot voltage $V_H$) from the AC power source 202. The controllable electrical outlet 200 may further comprise a first load-side hot electrical connection $H_{LOAD1}$ and a first load-side neutral electrical connection $N_{OUT1}$, which may be provided at an electrical receptacle (e.g., the upper unswitched receptacle 112 of the controllable electrical outlet 110) for powering a first electrical load (e.g., a first plug-in electrical load). The hot voltage $V_H$ received at the line-side hot electrical connection $H_{LINE}$ may be fed through the controllable electrical outlet 200 to the first load-side hot electrical connection $H_{LOAD1}$.

The controllable electrical outlet 200 may further comprise a second load-side hot electrical connection $H_{LOAD2}$ and a second load-side neutral electrical connection $N_{LOAD2}$, which may also be provided at an electrical receptacle (e.g., the lower switched receptacle 114 of the controllable electrical outlet 110) for powering a second electrical load (e.g., a second plug-in electrical load). The controllable electrical outlet 200 may comprise a load control circuit 210 (e.g., a controllable switching circuit, such as a relay) coupled in series electrical connection between the line-side hot electrical connection $H_{LINE}$ and the second load-side hot electrical connection $H_{LOAD2}$. The load control circuit 210 may comprise a relay having a single-pole single-throw (SPST) mechanical switch coupled in series electrical connection between the line-side hot electrical connection $H_{LINE}$ and the second load-side hot electrical connection $H_{LOAD2}$ and at least one operating coil for opening and closing the SPST switch. The load control circuit 210 may be rendered conductive and non-conductive in response to a control circuit 212 (e.g., a digital control circuit) to provide a switched-hot voltage (e.g., the switched-hot voltage $V_{SH}$) at the second load-side hot electrical connection $H_{LOAD2}$ for turning the second electrical load on and off. For example, the control circuit 212 may be coupled to the at least one operating coil of the relay for opening and closing the SPST switch of the relay. The control circuit 212 may include one or more of a processor (e.g., a microprocessor), a microcontroller, a programmable logic device (PLD), a field programmable gate array (FPGA), an application specific integrated circuit (ASIC), or any suitable processing device.

The controllable electrical outlet 200 may further comprises a third load-side hot electrical connection $H_{LOAD3}$ and a third load-side neutral electrical connection $N_{LOAD3}$. For example, the third load-side hot electrical connection $H_{LOAD3}$ may be provided at a wired electrical connection, such as a screw terminal (e.g., the controlled wired output 118 of the controllable electrical outlet 110) for powering one or more downstream standard electrical outlets (e.g., the standard electrical outlets 120). The third load-side neutral electrical connection $N_{LOAD3}$ may also be provided at a screw terminal. However, the third load-side neutral electrical connection $N_{LOAD3}$ may be an optional connection since the third load-side neutral electrical connection $N_{LOAD3}$ is coupled to the line-side neutral electrical connection $N_{LINE}$ (e.g., which is coupled to the neutral side of the AC power source 202). The switched-hot voltage $V_{SH}$ may be provided at the third load-side switched-hot electrical connection $H_{LOAD3}$. The downstream electrical outlets may receive the switched-hot voltage $V_{SH}$ via an electrical wire 208 (e.g., the electrical wire 128 of FIG. 1). The control circuit 212 may be configured to control the load control circuit 210 for connecting power to or disconnecting power from one or more of the receptacles of each of the downstream electrical outlets. The downstream electrical outlets may receive the hot voltage $V_H$ via an electrical wire (e.g., the electrical wire 126 of FIG. 1) that is wired to the line-side hot electrical connection $H_{LINE}$ in the electrical wallbox of the controllable electrical outlet 200.

Alternatively or additionally, the load control circuit 210 may comprise a dimmer circuit or driver circuit for controlling the amount of power delivered to the electrical loads connected to the second load-side hot electrical connection $H_{LOAD2}$, the third load-side hot electrical connection $H_{LOAD3}$, and/or the downstream electrical outlets. For example, the load control circuit 210 may comprise a bidirectional semiconductor switch (e.g., a triac), which may be controlled by the control circuit 212 using a standard phase-control dimming technique.

The controllable electrical outlet 200 may comprise one or more sense circuits for detecting and/or measuring the power being consumed by the electrical loads plugged into the controllable electrical outlet 200 and/or the downstream electrical outlets. For example, the controllable electrical outlet 200 may comprise a first sense circuit 214 coupled in series between the line-side hot electrical connection $H_{LINE}$ and the first load-side hot electrical connection $H_{LOAD1}$ for measuring a load current conducted by the first electrical load, and a second sense circuit 216 coupled in series with the load control circuit 210 for measuring a load current conducted by the second electrical loads and one or more electrical loads plugged into the downstream electrical outlets. The sense circuits 214, 216 may generate respective first and second sense signals $V_{S1}$, $V_{S2}$ that are received by the control circuit 212 and are representative of the magnitudes of the respective load currents.

While the downstream electrical outlets may receive the hot voltage $V_H$ via an electrical wire that is wired to the line-side hot electrical connection $H_{LINE}$ as described above, the downstream electrical outlets could (e.g., alternatively) receive power through the controllable electrical outlet 200. For example, the controllable electrical outlet 200 could comprise one or more additional electrical connections to which the unswitched receptacles of the downstream electrical outlets could be connected. The first sense circuit 214 could be coupled to the additional electrical connections, for example, such that a total load current of the first electrical load and the unswitched receptacles of the downstream electrical outlets may be conducted through the first sense circuit 214. Accordingly, the magnitude of the first sense signal $V_{S1}$ generated by the first sense circuit 214 may be representative of the total load current of the unswitched electrical loads coupled to the controllable electrical outlet 200, and the magnitude of the second sense signal $V_{S2}$ generated by the sense circuit 216 may be representative of the total load current of the switched electrical loads controlled by the controllable electrical outlet 200.

The controllable electrical outlet 200 may comprise a communication circuit 218, for example, a wireless communication circuit (e.g., an RF transceiver coupled to an antenna) for transmitting and receiving digital messages (e.g., via wireless signals, such as the RF signals 108 of FIG. 1). The communication circuit 218 may be configured to receive the digital messages via the RF signals 108 according to a predefined RF communication protocol, such as, for example, one or more of LUTRON CLEAR CONNECT, WIFI, BLUETOOTH, ZIGBEE, Z-WAVE, KNX-RF, LTE, or ENOCEAN RADIO protocols. Alternatively, the communication circuit 218 may comprise an RF transmitter for only transmitting RF signals and/or an RF receiver for only receiving RF signals. The controllable electrical outlet 200 may be configured to receive the digital messages via a different wireless medium, such as, for example, infrared (IR) signals or sound (e.g., voice). In addition, the communication circuit 218 may comprise a power-line communication (PLC) circuit and/or a wired communication circuit, for example, a digital communication link operating in accordance with a predefined communication protocol (e.g., of Ethernet, IP, XML, Web Services, QS, DMX, BACnet, Modbus, LonWorks, and/or KNX protocols), a serial digital communication link, an RS-485 communication link, an RS-232 communication link, a digital addressable lighting interface (DALI) communication link, a LUTRON ECO-SYSTEM communication link, or an analog control link. In addition, the communication circuit 218 could be adapted to receive one of a line-voltage control signal, a phase-control signal, a 0-10V control signal, and a contact closure output control signal.

The controllable electrical outlet 200 may comprise a memory 220 communicatively coupled to the control circuit 212. The control circuit 212 may be configured to use the memory 220 for the storage and/or retrieval of, for example, the serial numbers of the input devices (e.g., the wireless transmitters) to which the controllable electrical outlet 200 is responsive (e.g., associated with). The memory 220 may be implemented as an external integrated circuit (IC) or as an internal circuit of the control circuit 212.

The controllable electrical outlet 200 may comprise one or more actuators 222 (e.g., buttons) for providing manual user inputs to the control circuit 212. For example, the control circuit 212 may be configured to control the load control circuit 210 to render the relay conductive and non-conductive in response to actuations of the actuators 222. In addition, the control circuit 212 may be configured to associate the controllable electrical outlet 200 with one or more of the input devices (e.g., the remote control device 130, the occupancy sensor 140, and the controller 150) in response to actuations of one or more of the actuators 222 (e.g., the programming button 119 of the controllable electrical outlet 110).

The controllable electrical outlet 200 may include a power supply 224 coupled between the line-side hot electrical connection $H_{LINE}$ and the line-side neutral electrical connection $N_{LINE}$ for generating a DC supply voltage $V_{CC}$ for powering one or more of the control circuit 212, the communication circuit 218, the memory 220, and other low-voltage circuitry of the controllable electrical outlet 200.

The control circuit 212 may be configured to control the load control circuit 210 to render the relay conductive and non-conductive in response to digital messages received via RF signals from input devices (e.g., the remote control device 130, the occupancy sensor 140, and the system controller 150 shown in FIG. 1). For example, the control circuit 212 may receive digital messages including commands for providing manual control of the switched electrical loads (e.g., from the remote control device 130) and/or for providing automated control of the switched electrical loads (e.g., from the occupancy sensor 140 and/or the system controller 150). A system controller (e.g., the system controller 150) may be configured to transmit digital messages to the controllable electrical outlet 200 to control the switched electrical loads in accordance with one or more timeclock events of a timeclock schedule, for example, to turn on the switched electrical loads during the day and to turn off the switched electrical loads at night. In addition, the control circuit 212 may be configured to cause the communication circuit 218 to transmit, for example, one or more digital messages including information regarding the power consumed by the unswitched and/or switched electrical loads to the system controller.

After controlling the load control circuit 210 in response to digital messages received via the communication circuit 218, the control circuit 212 may be configured to store in the memory 220 information regarding the type of input device from which the communication circuit 218 received the digital message, and/or how the control circuit 212 controlled the load control circuit 210 in response to that digital message. The control circuit 212 may transmit this information to the system controller for analysis regarding how much energy is saved in response to certain types of input devices. For example, the system controller 150 may be configured to determine how much energy is saved as a result of the controllable electrical outlet 200 turning off the controlled electrical loads in response to the occupancy sensor 140 versus how much energy is saved as a result of the controllable electrical outlet turning off the controlled electrical loads in response to the remote control device 130.

The control circuit 210 may be configured to measure the amount of power consumed by the unswitched electrical loads (e.g., in response to the first sense signal $V_{S1}$ generated by the first sense circuit 214) and/or to determine the amount of power consumed by the switched electrical loads (e.g., in response to the second sense signal $V_{S2}$ generated by the sense circuit 216). The control circuit 210 may be configured to determine a balance between the amount of power consumed by the unswitched and switched electrical loads and report this information to the system controller. The controllable electrical outlet 200 and/or the system controller may be configured to transmit a digital message including an alert that the amount of power consumed by the unswitched and switched electrical loads is unbalanced (e.g., in an email or text message).

The control circuit 212 may be configured to detect whether one or more of the electrical loads plugged into the controllable electrical outlet and/or the downstream electrical outlets are off, are in the standby mode, and/or are not charging a rechargeable load. The control circuit 212 may be configured to determine that a plug-in electrical load is off, is in standby mode, and/or is not charging a rechargeable load if the magnitude of the load current conducted by the plug-in electrical load is less than a predetermined current threshold. For example, the control circuit 212 may be configured to control the load control circuit 210 to remove power from the plug-in electrical load if the control circuit has received a digital message indicating a vacancy condition from an occupancy or vacancy sensor and has determined that the plug-in electrical load is off, is in the standby mode, and/or is not charging a rechargeable load. The control circuit 212 may not remove power from the plug-in electrical load when the load is on or charging.

The control circuit 212 may be configured to determine if a critical load is plugged into the controllable electrical outlet 220 and/or the downstream electrical outlets. The control circuit 212 may be configured to disable control of the critical load by the input devices (e.g., the remote control device 130, the occupancy sensor 140, and/or the controller 150). For example, the control circuit 212 may be configured to determine that a particular plug-in electrical load (e.g., a computer) is plugged into one of the controllable electrical outlet and/or the downstream electrical outlets by monitoring an electrical signature of the load current drawn by the electrical load. The control circuit 212 may be configured to record the electrical signature of the load current conducted by a plug-in electrical load plugged into the controllable electrical outlet 200 and/or the downstream electrical outlets (e.g., using one of the first and second sense circuits 214, 216) and to store the recorded electrical signature in the memory 220. The controllable electrical outlet 200 may have one or more predetermined electrical signatures of critical loads stored in the memory 220 prior to installation. The control circuit 212 may be configured to compare an electrical signature drawn by a plug-in electrical load plugged into the controllable electrical outlet 200 and/or the downstream electrical outlets to one or more of the plurality of electrical signatures stored in the memory 220. If the electrical signature shows that the electrical load plugged into one of the controllable electrical outlet 200 and/or the downstream electrical outlets is a critical load, the control circuit 212 may be configured to continuously power the critical load at all times. For example, the controllable electrical outlet 200 may prevent power from being disconnected from the critical load in response to a signal received from an input device (e.g., the remote control device 130, the occupancy sensor 140, and/or the controller 150).

The control circuit 212 may be configured to determine that the room in which the controllable electrical outlet 200 is located is occupied based on a magnitude of the load current conducted by an electrical load plugged into the controllable electrical outlet 200 and/or a downstream electrical outlet. For example, if the magnitude of the load current conducted by a particular plug-in electrical load has increased and/or is actively changing, the control circuit 212 may be configured to determine that the room in occupied. If the control circuit 212 determines that one or more of the electrical loads plugged into the controllable electrical outlet 200 and/or the downstream electrical outlets are off, are in the standby mode, and/or are not charging a rechargeable load, the control circuit 212 may determine that the room is vacant. The control circuit 212 may be configured to control the load control circuit 210 in response to the occupancy and/or vacancy conditions determined from the magnitudes of one or more load currents.

FIG. 3A is a perspective view of an example controllable electrical outlet 300. The controllable electrical outlet 300 may be an example of the controllable electrical outlet 110 of FIG. 1 and/or the controllable electrical outlet 200 of FIG. 2. The controllable electrical outlet 300 may comprise a front enclosure portion 302 and a rear enclosure portion 304. The controllable electrical outlet 300 may be mounted to a standard electrical wallbox. The controllable electrical outlet 300 may include similar circuitry as the controllable electrical outlet 200 (as shown FIG. 2), which may be housed in both the front and rear enclosure portions 302, 304. For example, a portion of the electrical circuitry may be located in the rear enclosure portion 304 (e.g., the load control circuit 210 and the power supply 224) and a portion of the electrical circuitry may be located in the front enclosure portion 302 (e.g., the control circuit 212, the memory 220, and the wireless communication circuit 218). Accordingly, the controllable electrical outlet 300 may comprise a wireless communication circuit that is located outside of the electrical wallbox. The front enclosure portion 302 may comprise a programming button 306 (e.g., the programming button 119 and/or one of the actuators 222), which may be actuated to associate the controllable electrical outlet 300 with one or more input devices (e.g., wireless transmitters). The controllable electrical outlet 300 may be responsive to RF signals and may be installed in the same room in which the input devices are located to enhance the reliability of the RF communications.

The rear enclosure portion 304 may comprise a hot screw terminal 308 for receiving a hot voltage from an AC power source (e.g., the line voltage input 116 of the controllable electrical outlet 110 and/or the line-side hot electrical connection $H_{LINE}$ of the controllable electrical outlet 200). The rear enclosure portion 304 may also comprise at least one neutral terminal (not shown) adapted to be coupled to the neutral side of the AC power source (e.g., the line-side neutral electrical connection $N_{LINE}$ of the controllable electrical outlet 200). The rear enclosure portion 304 may comprise a wired-output screw terminal 310 (e.g., the controlled wired output 118 of the controllable electrical outlet 110 and/or the third load-side hot electrical connection $H_{LOAD3}$ of the controllable electrical outlet 200). The wired-output screw terminal 310 may be adapted to be electrically connected to one or more downstream standard electrical outlets (e.g., the standard electrical outlets 120). The controllable electrical outlet 300 may provide a switched-hot voltage $V_{SH}$ at the wired-output screw terminal 310, such that the controllable electrical outlet may be able to connect power to or disconnect power from one or more of the receptacles of each of the downstream electrical outlets.

The front enclosure portion 302 may comprise upper and lower receptacles 312, 314 for receiving the plugs of plug-in electrical loads. For example, the upper receptacle 312 may be an unswitched receptacle (e.g., similar to the upper receptacle 112 of the controllable electrical outlet 110 and/or the first load-side hot and neutral electrical connections $H_{LOAD1}$, $N_{LOAD1}$ of the controllable electrical outlet 200) and the lower receptacle 314 may be a switched receptacle (e.g., similar to the lower receptacle 114 of the controllable electrical outlet 110 and/or the second load-side hot and neutral electrical connections $H_{LOAD2}$, $N_{LOAD2}$ of the controllable electrical outlet 200). The controllable electrical outlet 300 may also comprise receptacles located on the sides, top, and/or bottom of the front enclosure portion 302 (not shown).

The front enclosure portion 302 may be configured to be detached from the rear enclosure portion 304. The controllable electrical outlet 300 may comprise a mounting yoke (not shown) that may be connected to the rear enclosure portion 304. The mounting yoke may be mounted to the electrical wallbox while the front enclosure portion 302 is detached from the rear enclosure portion 304. The hot screw terminal 308 may be connected to the AC power source and the wired-output screw terminal 310 may be connected to the downstream electrical outlets. After the rear enclosure portion 304 is mounted to the wallbox, the front enclosure portion 302 may be attached to the rear enclosure portion 304, e.g., via a mounting screw 316. The front enclosure portion 302 may be adapted to be located (e.g., mostly located) outside the electrical wallbox.

FIG. 3B is a perspective view of another example controllable electrical outlet 320. The controllable electrical outlet 320 may be an example of the controllable electrical outlet 110 of FIG. 1 and/or the controllable electrical outlet 200 of FIG. 2. The controllable electrical outlet 320 may be mounted to an electrical wallbox. The controllable electrical outlet 320 may comprise a bezel portion 322 adapted to be received through an opening of a faceplate 325. The controllable electrical outlet 320 may include circuitry that is similar to the circuitry of the controllable electrical outlet 200. The circuitry may be housed (e.g., housed entirely) in a rear enclosure portion 324 of the controllable electrical outlet 320, for example, such that a wireless communication circuit (e.g., the wireless communication circuit 218) may be located inside of the wallbox. An actuator, such as a programming button 326 may be provided on the bezel portion 322. The programming button 326 may be actuated to associate the controllable electrical outlet 320 with one or more input devices (e.g., wireless transmitters).

The bezel portion 322 may comprise an upper receptacle 332 (e.g., an unswitched receptacle) and a lower receptacle 334 (e.g., a switched receptacle) for receiving the plugs of plug-in electrical loads (e.g., such as on the controllable electrical outlet 300 shown in FIG. 3A). The controllable electrical outlet 320 may comprise a mounting yoke (not shown) that is connected to the rear enclosure portion 324 and allows the controllable electrical outlet 320 to be mounted to the electrical wallbox. The faceplate 325 may be attached to the mounting yoke via one or more screws, such as the two screws 336 shown in the example of FIG. 3B. The controllable electrical outlet 320 may be responsive to RF signals and may be installed in the same room in which the input devices are located to enhance the reliability of the RF communications.

The rear enclosure portion 324 may comprise a hot screw terminal 328 for receiving a hot voltage from an AC power source and a neutral terminal (not shown) adapted to be coupled to the neutral side of the AC power source (e.g., similar to the controllable electrical outlet 300 shown in FIG. 3A). The rear enclosure portion 324 may also comprise a wired-output screw terminal 330 adapted to be electrically connected to one or more downstream standard electrical outlets. The controllable electrical outlet 320 may provide a switched-hot voltage at the wired-output screw terminal 330, such that the controllable electrical outlet 320 is able to connect power to or disconnect power from one or more of the receptacles of one or more downstream electrical outlets.

FIG. 3C is a perspective view of another example controllable electrical outlet 350. The controllable electrical outlet 350 may be an example of the controllable electrical outlet 110 of FIG. 1 and/or the controllable electrical outlet 200 of FIG. 2. The controllable electrical outlet 350 may be configured to be plugged into a standard electrical outlet 340 that has upper and lower receptacles 342, 344. The standard electrical outlet 340 may comprise a rear enclosure 345 having a first hot screw terminal 346 for receiving a hot voltage from an AC power source, a second hot screw terminal 348 adapted to be electrically connected to one or more downstream standard electrical outlets, and at least one neutral terminal (not shown) adapted to be coupled to the neutral side of the AC power. The first hot screw terminal 346 may be electrically connected to the upper receptacle 342 and the second hot screw terminal 348 may be electrically connected to the lower receptacle 344. The standard electrical outlet 340 may be adapted to be mounted to a standard electrical wallbox.

The controllable electrical outlet 350 may comprise an enclosure 352 having upper and lower electrical receptacles 354, 356 (for receiving the plugs of plug-in electrical loads) provided on a front surface 358. The controllable electrical outlet 350 may comprise upper and lower electrical plugs 360, 362 provided on a rear surface 364. The upper and lower electrical plugs 360, 362 may be adapted to plug into the upper and lower receptacles 342, 344 of the standard electrical outlet 340, respectively. Accordingly, the upper electrical plug 360 may be adapted to be coupled to the AC power source via the upper receptacle 342 for receiving the hot voltage $V_H$. As such, the upper electrical plug 360 may receive the hot voltage $V_H$, which for example, may be similar to as described with reference to the line-side hot and neutral electrical connections $H_{LINE}$, $N_{LINE}$ of the controllable electrical outlet 200. The lower electrical plug 362 may be adapted to be coupled to the downstream electrical outlets via the lower receptacle 344. As such, the lower electrical plug 362 may operate similar to the third load-side hot and neutral electrical connections $H_{LOAD3}$, $N_{LOAD3}$ of the controllable electrical outlet 200. Thus, the upper electrical plug 360 may operate similar to the line voltage input 116 of FIG. 1, while the lower electrical plug 362 may operate similar to the wired output 118 of FIG. 1.

The controllable electrical outlet 350 may include circuitry that is similar to the circuitry of the controllable electrical outlet 200. The circuitry may be housed (e.g., housed entirely) in the enclosure 352 of the controllable electrical outlet 350 (e.g., such that the wireless communication circuit 218 may be located outside of the wallbox). For example, the upper receptacle 354 may be an unswitched receptacle and the lower receptacle 356 may be a switched receptacle. The enclosure 352 may comprise a programming button 366 (e.g., the programming button 119 and/or one of the actuators 222), which may be actuated to associate the controllable electrical outlet 350 with one or more input devices (e.g., wireless transmitters). The controllable electrical outlet 350 may be responsive to RF signals and may be installed in the same room in which the input devices are located to enhance the reliability of the RF communications. The controllable electrical outlet 350 may be fixedly attached to the standard electrical outlet 340 via a mounting screw 368 (e.g., a "tamper-proof" screw) received through an opening 369 of the standard electrical outlet 350, for example, to prevent removal or theft of the controllable electrical outlet 350 after installation.

The controllable electrical outlet 350 may additionally or alternatively comprise upper and lower receptacles 370, 372 located on a side surface 374 of the enclosure 352. For example, the upper and lower receptacles 370, 372 on the side surface 374 may operate the same as the upper and lower receptacle 354, 356 on the front surface 358, respectively. In other words, the upper receptacle 370 may be an unswitched receptacle and the lower receptacle 372 may be a switched receptacle. Since the upper and lower receptacles 370, 372 are arranged at a right angle to the front surface of the standard electrical outlet 340, the upper and lower receptacles 370, 372 on the side surface 374 may accommodate electrical plugs if there is not much room between the standard electrical outlet 350 and adjacent furniture. The controllable electrical outlet 350 may additionally or alternatively comprise one or more receptacles located on the top surface and/or bottom surface of the enclosure 352.

If one of more of the controllable electrical outlets 300, 320, 350 includes a load control circuit for controlling the amount of power delivered to the plug-in electrical loads (e.g., a dimmer circuit), the respective electrical outlet may comprise a protrusion at the controlled receptacle for preventing a standard electrical plug from being plugged into the controlled receptacle. Examples of such protrusions for preventing standard plugs from being plugged into a controlled receptacle are described in greater detail in commonly-assigned U.S. Pat. No. 7,198,523, issued Apr. 3, 2007, and U.S. Pat. No. 7,311,558, issued Dec. 25, 2007, both entitled RECEPTACLE AND PLUG THEREFOR, the entire disclosures of which are hereby incorporated by reference.

While the controllable electrical outlets 300, 320, 350 shown in FIGS. 3A-3C have U.S. style receptacles and/or plugs, the controllable electrical outlets 300, 320 350 may alternatively or additionally have receptacles and/or plugs of styles used in other countries. In addition, the controllable electrical outlets 300, 320, 350 could comprise other types of receptacles, for example, one or more Universal Serial Bus (USB) connectors, and an internal power supply for charging an electrical device, such as the battery of a smart phone.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A controllable electrical outlet for use in a load control system which also has at least one standard electrical outlet, the load control system adapted to receive power from a power source, the controllable electrical outlet comprising:
    an electrical receptacle configured to receive a plug of a plug-in electrical load;
    a first electrical connection configured to be electrically coupled to the power source to receive a hot voltage to power the plug-in electrical load;
    a second electrical connection configured to be electrically coupled to the standard electrical outlet;
    a load control circuit electrically coupled in series between the first and second electrical connections to control power delivered to the standard electrical outlet;
    a communication circuit configured to receive a digital message; and
    a digital control circuit coupled to the load control circuit and the communication circuit to control power delivered to the standard electrical outlet in response to the digital message received via the communication circuit.

2. The controllable electrical outlet of claim 1, wherein the controllable electrical outlet is configured to be mounted to an electrical wallbox.

3. The controllable electrical outlet of claim 2, wherein the communication circuit comprises a wireless communication circuit configured to receive the digital message from an input device via a wireless signal.

4. The controllable electrical outlet of claim 3, wherein the digital message received from the input device comprises information regarding an occupancy or vacancy condition in a space in which the controllable electrical outlet is installed.

5. The controllable electrical outlet of claim 3, wherein the digital message received from the input device comprises information regarding an actuation of a button of the input device.

6. The controllable electrical outlet of claim 3, further comprising:
    an actuator configured to be actuated to associate the controllable electrical outlet with the input device, the actuator located outside of the electrical wallbox and accessible to a user when the controllable electrical outlet is mounted to the electrical wallbox.

7. The controllable electrical outlet of claim 1, wherein the load control circuit comprises a switching circuit for generating a switched-hot voltage.

8. The controllable electrical outlet of claim 7, wherein the switched-hot voltage is provided to the second electrical connection.

9. The controllable electrical outlet of claim 7, wherein the electrical receptacle is configured to provide the hot voltage to the plug-in electrical load to continuously power the plug-in electrical load.

10. The controllable electrical outlet of claim 7, wherein the electrical receptacle is configured to provide the switched-hot voltage to the plug-in electrical load, and the digital control circuit is configured to control the power delivered to the plug-in electrical load in response to the digital message received via the communication circuit.

11. The controllable electrical outlet of claim 7, wherein the switching circuit comprises a relay having a mechanical switch electrically coupled between the first and second electrical connections to control power delivered to the standard electrical outlet, the digital control circuit coupled to an operating coil of the relay for opening and closing the mechanical switch of the relay.

12. The controllable electrical outlet of claim 1, further comprising:
    a first sense circuit electrically coupled in series with the load control circuit and configured to measure a magnitude of a first load current conducted through the second electrical connection.

13. The controllable electrical outlet of claim 12, further comprising:
    a third electrical connection adapted to be coupled to a second standard electrical outlet to provide the hot voltage to the second standard electrical outlet; and
    a second sense circuit electrically coupled in series between the first and second electrical connections and configured to measure a magnitude of a second load current conducted through the third electrical connection;
    wherein the digital control circuit is configured to transmit an alert if the magnitude of the second load current is much greater than the magnitude of the first load current.

14. The controllable electrical outlet of claim 12, wherein the digital control circuit is configured to cause the communication circuit to transmit a digital message including information regarding the magnitude of the first load current measured by the first sense circuit.

15. The controllable electrical outlet of claim 12, wherein the digital control circuit is configured to determine information regarding an occupancy or vacancy condition in a space in which the controllable electrical outlet is installed in response to the magnitude of the first load current.

16. The controllable electrical outlet of claim 1, further comprising:
    an enclosure having a rear surface;
    wherein the first and second electrical connections comprise first and second plugs arranged on the rear surface of the enclosure.

17. The controllable electrical outlet of claim 16, wherein the electrical receptacle is provided on a front surface or a side surface of the enclosure.

18. The controllable electrical outlet of claim 16, wherein the first and second plugs are configured to be received in electrical receptacles of a standard electrical outlet.

19. The controllable electrical outlet of claim 16, wherein the load control circuit, the communication circuit, and the digital control circuit are all located inside the enclosure.

20. The controllable electrical outlet of claim 1, further comprising:
    a rear enclosure portion;
    wherein the first and second electrical connections comprise screw terminals on the rear enclosure portion.

21. The controllable electrical outlet of claim 20, wherein the load control circuit, the communication circuit, and the digital control circuit are all located inside the rear enclosure portion and the electrical receptacle is provided on a bezel portion of the controllable electrical outlet.

22. The controllable electrical outlet of claim 20, further comprising:
    a front enclosure portion coupled to the rear enclosure portion, the electrical receptacle provided on the front enclosure portion;
    wherein the load control circuit is located inside the rear enclosure portion, and the communication circuit and the digital control circuit are located inside the front enclosure portion.

23. The controllable electrical outlet of claim 1, wherein the digital control circuit is configured to detect that the plug-in electrical load is in a standby mode and to control the load control circuit to disconnect power from the plug-in electrical load in response to receiving the digital message when the plug-in electrical load is in the standby mode.

24. The controllable electrical outlet of claim 1, wherein the digital control circuit is configured to compare an electrical signature of the plug-in electrical load to one or more electrical signatures stored in a memory and to cease controlling the power delivered to the plug-in electrical load in response to the digital message if the electrical signature of the plug-in electrical load matches one of the electrical signatures stored in the memory.

25. A load control system for controlling one or more plug-in electrical loads adapted to receive power from a power source, the load control system comprising:
   a standard electrical outlet adapted to receive power from the power source and comprising at least one electrical receptacle configured to receive a plug of a first plug-in electrical load;
   a controllable electrical outlet adapted to receive power from the power source, the controllable electrical outlet comprising an electrical receptacle configured to receive a plug of a second plug-in electrical load and an electrical connection configured to be electrically coupled to the standard electrical outlet; and
   an input device configured to transmit a digital message;
   wherein the controllable electrical outlet is configured to control the power delivered to the standard electrical outlet in response to the digital message.

26. The load control system of claim 25, wherein the controllable electrical outlet is configured to be mounted to an electrical wallbox.

27. The load control system of claim 26, wherein the input device is configured to wirelessly transmit the digital message to a system controller and the system controller is configured to wirelessly transmit a second digital message to the controllable electrical outlet.

28. The load control system of claim 26, wherein the input device is configured to wirelessly transmit the digital message directly to the controllable electrical outlet.

29. The load control system of claim 28, wherein the controllable electrical outlet is configured to receive digital messages directly from the input device when the controllable electrical outlet is associated with the input device.

30. The load control system of claim 28, further comprising:
   a system controller configured to communicate with the controllable electrical outlet;
   wherein the controllable electrical outlet is configured to control the plug-in electrical load in response to the received wireless signal, the controllable electrical outlet configured to store a type of input device when the controllable electrical outlet receives a wireless signal from the input device, the controllable electrical outlet configured to transmit to the system controller one or more digital messages including the type of input device and how the controllable electrical outlet controlled the plug-in electrical load in response to the wireless signal, the system controller configured to determine how much energy has been saved as a result of the type of input device.

31. The load control system of claim 30, wherein the controllable electrical outlet is configured to transmit a digital message including information regarding a magnitude of load current measured by the controllable electrical outlet to the system controller.

32. The load control system of claim 25, wherein the controllable electrical outlet is configured to measure a magnitude of a load current conducted through the electrical connection to the standard electrical outlet.

33. The load control system of claim 25, further comprising:
   a system controller configured to communicate with the controllable electrical outlet; and
   wherein the controllable electrical outlet is configured to transmit a digital message including information regarding the magnitude of the load current measured by the controllable electrical outlet to the system controller.

34. The load control system of claim 33, wherein the system controller is configured to determine information regarding an occupancy or vacancy condition in a space in which the controllable electrical outlet is installed in response to the magnitude of the load current measured by the controllable electrical outlet.

35. The load control system of claim 25, wherein the controllable electrical outlet is configured to measure a magnitude of a first load current conducted through one or more switched plug-in electrical loads and to measure a magnitude of a second load current conducted through one or more unswitched plug-in electrical loads.

36. The load control system of claim 35, wherein the controllable electrical outlet is configured to transmit an alert if the magnitude of the second load current is much greater than the magnitude of the first load current.

37. The load control system of claim 35, further comprising:
   a system controller configured to communicate with the controllable electrical outlet;
   wherein the controllable electrical outlet is configured to transmit the magnitudes of the first and second load currents to the system controller, the system controller configured to transmit an alert if the magnitude of the second load current is much greater than the magnitude of the first load current.

38. The load control system of claim 25, wherein the input device comprises a sensor configured to detect an occupancy or vacancy condition in a space in which the controllable electrical outlet is installed, and wherein the digital message transmitted by the input device comprises information regarding the occupancy or vacancy condition.

39. The load control system of claim 25, wherein the input device comprises a remote control device configured to transmit a digital message in response to an actuation of a button of the remote control device.

40. The load control system of claim 25, further comprising:
   a system controller configured to transmit a control signal to the controllable electrical outlet, the control signal transmitted by the system controller comprising one of: a timeclock command, a load shed command, a demand response command, a peak demand command, or time-of-day pricing information.

41. A controllable electrical outlet for use in a load control system which also has at least one standard electrical outlet, the load control system adapted to receive power from a power source, the controllable electrical outlet comprising:
   a line-side hot connection and a line-side neutral electrical connection connectable the power source to receive a hot voltage to power the plug-in electrical load;

an electrical receptacle having a first load-side hot electrical connection and a first load-side neutral electrical connection configured to be electrically connected to respective prongs of a plug of a plug-in electrical load;

a second load-side hot electrical connection connectable to the standard electrical outlet;

a load control circuit electrically coupled in series between the first and second electrical connections to control power delivered to the standard electrical outlet;

a communication circuit configured to receive a digital message; and a digital control circuit coupled to the load control circuit and the communication circuit to control power delivered to the standard electrical outlet in response to the digital message received via the communication circuit.

* * * * *